March 30, 1937.  N. E. BUCK ET AL  2,075,019
STOP JOINT FOR ELECTRIC CABLES
Filed Dec. 2, 1932  4 Sheets-Sheet 2
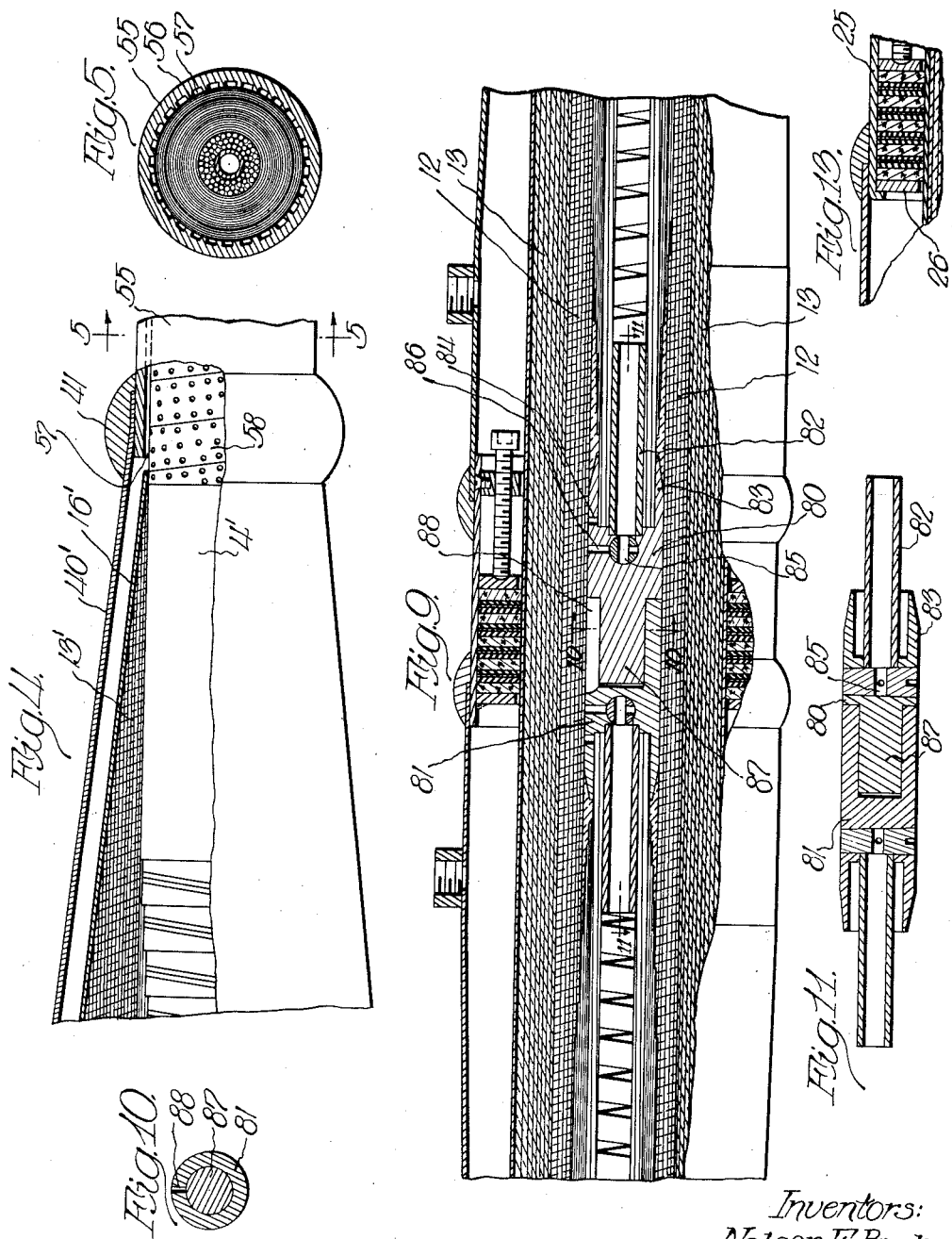
Inventors:
Nelson E. Buck
Denney W. Roper
Alexander P. Thoms

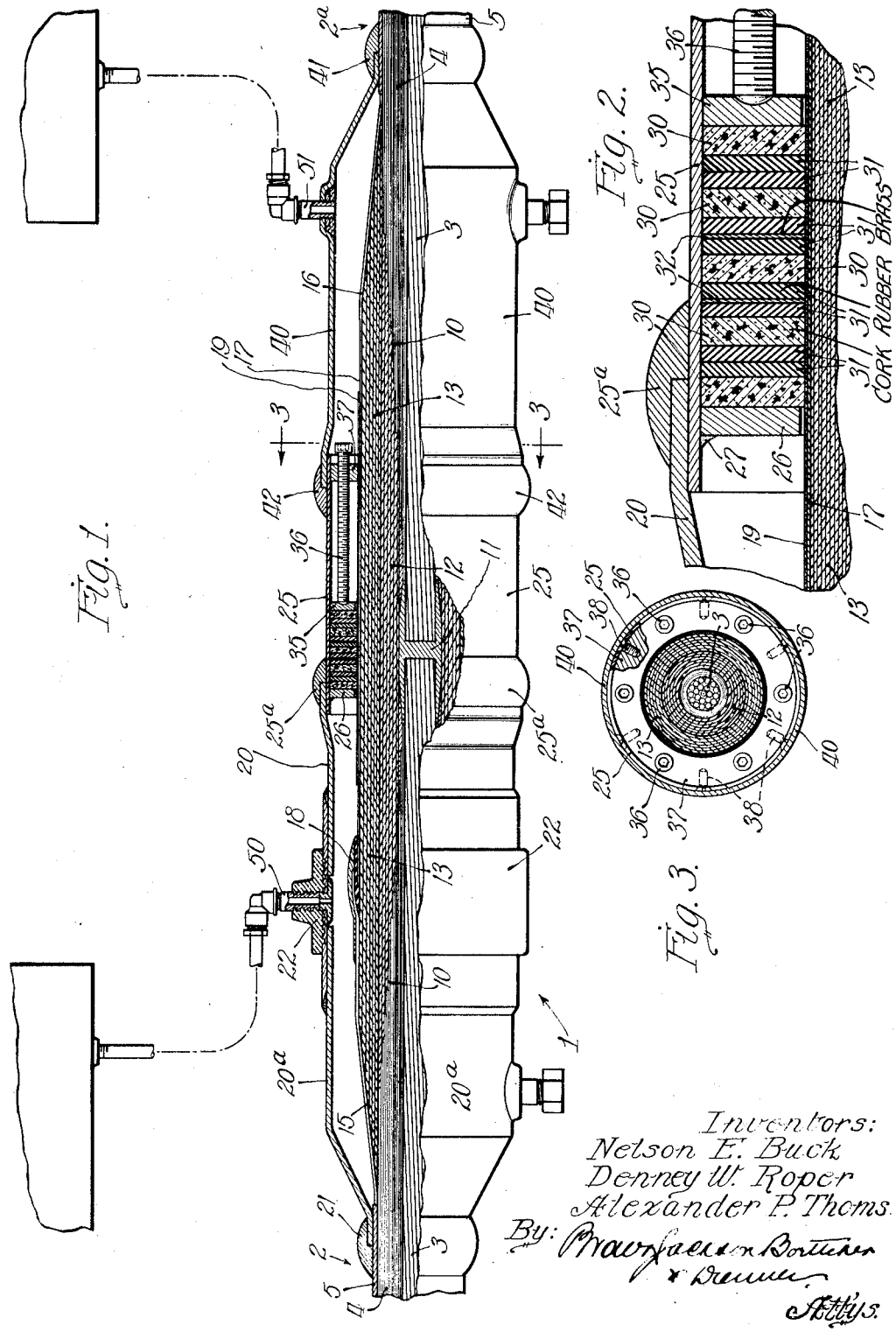

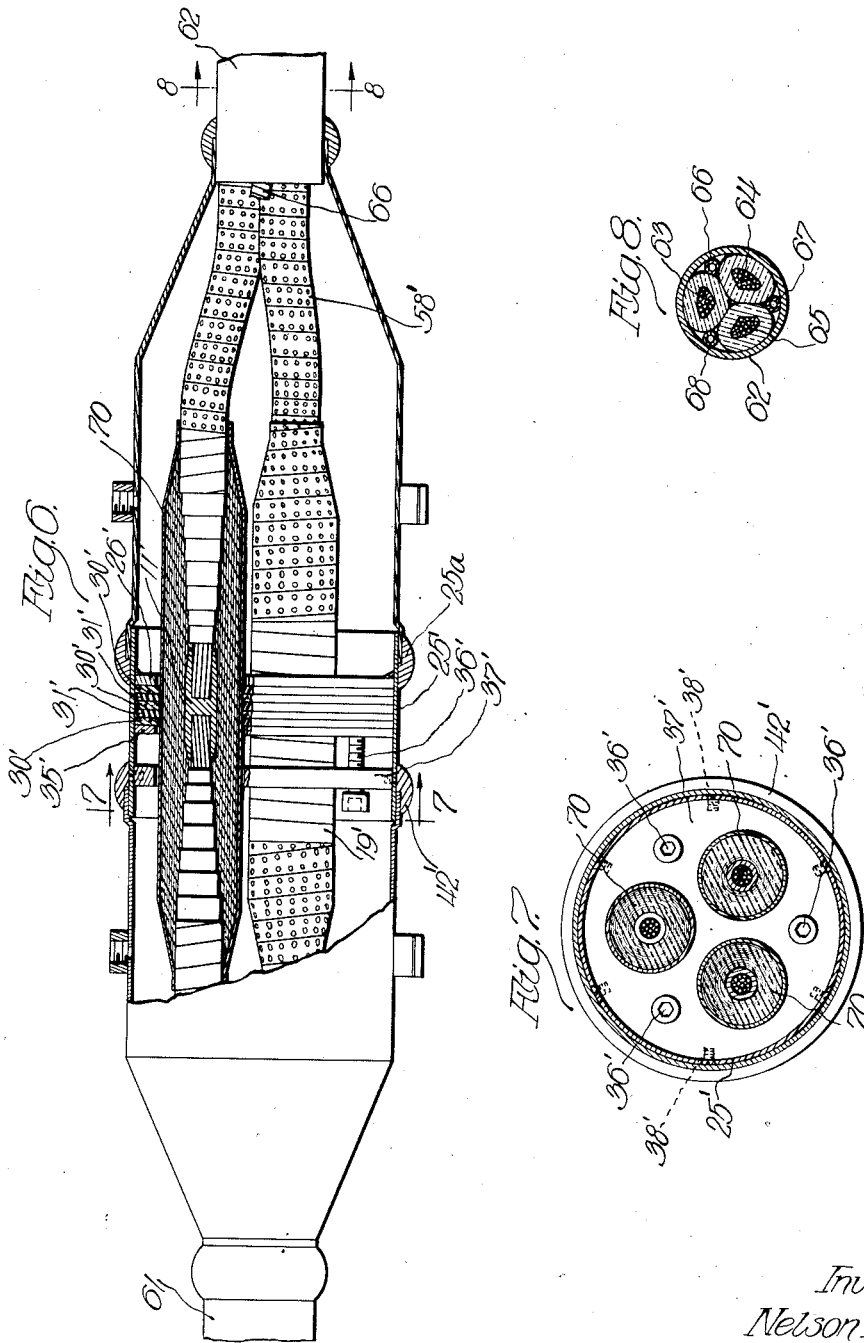

March 30, 1937.  N. E. BUCK ET AL  2,075,019
STOP JOINT FOR ELECTRIC CABLES
Filed Dec. 2, 1932  4 Sheets-Sheet 4
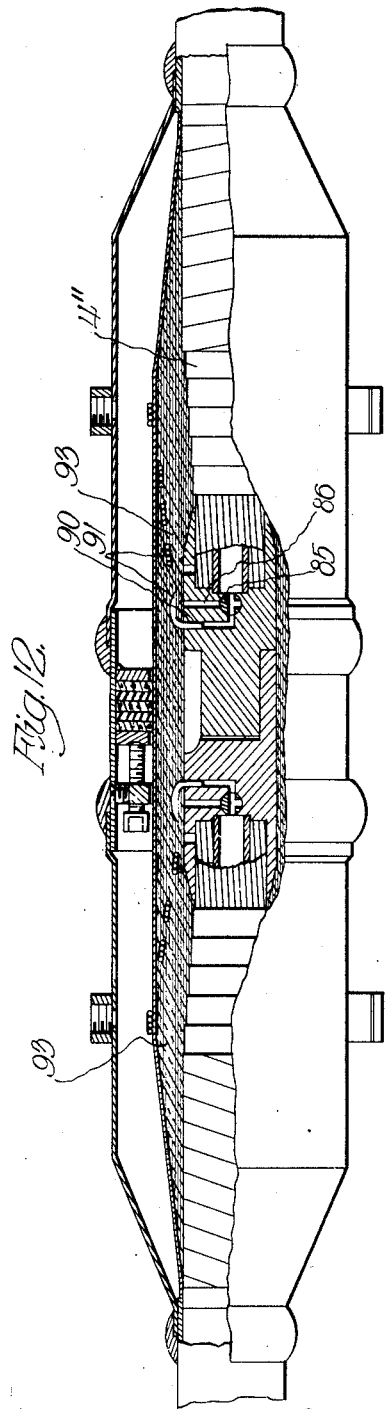
Inventors:
Nelson E. Buck
Denney W. Roper
Alexander P. Thoms Patented Mar. 30, 1937

2,075,019

UNITED STATES PATENT OFFICE 2,075,019

STOP JOINT FOR ELECTRIC CABLES

Nelson E. Buck and Denney W. Roper, Chicago, and Alexander P. Thoms, Winnetka, Ill.

Application December 2, 1932, Serial No. 645,424

15 Claims. (Cl. 173—268)

The present invention relates to joints between high-tension cables of either the solid or oil-filled type and either single or multiple-conductor.

In the solid type of cable the insulation is generally impregnated with a viscous dielectric of an oily nature. At the higher voltages, i. e., 33 kv. and above, it is the common practice to use oil for the joint filling compound, with suitable tanks connected to these joints for the purpose of maintaining this oil under pressure. When there are differences in the elevation of the lengths of cable in a line, or where riser cables are connected to horizontal portions, there is a tendency for the oil and cable impregnating compound to migrate from the higher to the lower portions. In such cases it is necessary to provide a joint which, while maintaining the electrical continuity, will prevent the transfer of oil from one connecting length to the other. This is commonly known as a stop-joint. Our invention covers a joint of this type.

In the oil-filled type of cable the pervious insulation is impregnated with a liquid dielectric, such as oil, and suitable oil channels are provided to permit this liquid dielectric to flow readily throughout the cable, maintaining the insulation full of such liquid dielectric and free from voids. On such cable it is common practice to provide stop-joints at spaced intervals to prevent the drainage of oil from any considerable length of cable, should the sheath or a joint casing or connecting pipe or tank be ruptured.

Stop joints now available are large and expensive, and require a manhole larger than ordinary for their installation. Many of the parts are large and heavy, and cumbersome to handle under manhole conditions. To overcome these objections there has been developed what is known in the art as a semi-stop-joint. This, as its name implies, affords only partial stoppage of the oil flow and is useful, therefore, to retard the flow of oil during construction of the joints. The continued leakage of oil past a semi-stop joint, due to constant differences of pressure, is highly objectionable.

It is the object of the present invention to provide a full-stop-joint, much smaller and cheaper than those now available and, in fact, comparable in size and cost with a regular joint.

In one form of our invention we accomplish the above ends by providing a solid barrier of material impervious to oil, extending from a special solid connector, that joins the cable conductors, to the outer sleeve. The material is placed under radial pressure to provide a tight seal at the various surfaces. One method of accomplishing this end is by using rings or discs of materials of the kind that expand radially upon compression axially, and compressing the rings or discs lengthwise of the joint to produce such radial expansion. Rubber is one such material. Rubber is adversely affected by oil, and we therefore protect the rubber by interposing similar rings or discs of cork which cover the rubber along substantially the entire surface that would otherwise be exposed to the oil.

The attainment of the above and further objects of the present invention will be apparent from the following specification, taken in conjunction with the accompanying drawings forming a part thereof.

In the drawings:

Figure 1 is a view, in partial section, of a joint embodying the principles of our invention;

Figure 2 is an enlarged fragmentary view of a portion of the joint shown in Figure 1;

Figure 3 is a transverse sectional view taken along the line 3—3 of Figure 1 and looking in the direction of the arrows;

Figure 4 is a fragmentary sectional view of the end portion of a joint involving a fluted sheath cable;

Figure 5 is a sectional view taken along the line 5—5 of Figure 4;

Figure 6 is a view illustrating our invention applied to a 3-conductor cable joint;

Figure 7 is a sectional view taken along the line 7—7 of Figure 6;

Figure 8 is a sectional view taken along the line 8—8 of Figure 6;

Figure 9 is a fragmentary sectional view illustrating our invention applied to a hollow core cable;

Figure 10 is a sectional view of the connector shown in Figure 9, said view being taken along the line 10—10 of Figure 9;

Figure 11 is a sectional view of the connector, taken along the line 11—11 of Figure 9;

Figure 12 is a fragmentary sectional view of an oil feeding stop joint for hollow core cables, and embodying our invention; and Figure 13 is a fragmentary view illustrating an alternate method of holding one of the end plates of the dam.

Reference may now be had more particularly to the joint shown in Figure 1. The joint is indicated by the reference numeral 1 and provides a mechanical and electrical connection between two similar cables indicated at 2 and 2a. Each of the cables comprises a stranded conductor 3, a wrapping of insulation 4, and an outer lead sheath 5, as is well known in the art. It is, of course, to be understood that the present invention is not limited to the precise type of cable shown, but is applicable to various kinds of cable. At the joint, the ends of the cable conductors 3—3 are bared of the original factory insulation 4, which insulation is stepped back as indicated at 10. The ends of the two conductors 3—3 are electrically connected by a copper connector 11, and insulated by a winding of insulating tape 12, which is applied over the connector 11 and over the stepped portions 10 of the original insulation 4, and an additional wrapping of tape 13 applied over the tape 12 and over a portion of the original factory insulation. The wrappings 12 and 13 may comprise varnished cambric tape. Varnished cambric tape is substantially impervious to the oil used in the joint. When wound varnished cambric tape is compressed it becomes entirely impervious to oil. The outer surface of the insulation 13 is maintained at ground potential, as by a copper braid or gauze 15 which is connected to the lead sheath 5 of the cable 2, and is wound around the adjacent outer end of the insulation 13. A similar braid or gauze 16 is connected to the lead sheath of the cable 2a and envelops the insulation 13. A wrapping of lead foil 17 extends the grounding connection from the copper braid 16 toward the copper braid 15, but is electrically insulated from the grounding screen 15 as by a wrapping of insulation 18 between the ends of the two grounding screens or shields. A layer of silk tape 19 is wound over the lead foil 17 adjacent the center of the joint.

The end of the joint adjacent the cable 2 is enclosed in a metallic sleeve comprising two sections, 20 and 20a, separated by an insulating unit 22. The section 20a is joined to the sheath 5 in any desired manner, as by a wiper joint 21. By this arrangement the electrical continuity of the lead sheath is broken, while ground potential is maintained throughout the outer surface of the insulation 13. This feature is not, per se, our invention, and reference may be had to the application of Herman Halperin and Alexander P. Thoms, Serial No. 165,566, for a discussion of the purpose of this arrangement.

A tube 25, of brass or the like, is secured to the joint sleeve 20 in any desired manner, as by means of a wiped joint 25a, and located around the connector 11. A ring 26, of brass or the like, is secured within the tube 25 as by a weld 27, which holds the ring 26 against movement to the left as seen in the drawings. If desired, the ring may be held against sliding movement to the left as seen in the drawings, in any other desired manner, as by a shoulder corresponding to the weld 27.

The oil stop dam is located within the tube 25, around the connector 11, and comprises a plurality of compressible discs which are compressed against the ring 26 to produce a radial expansion of the discs whereby the discs not only seal the space between the tube 25 and the insulation 13, but also firmly compress the insulation 13 toward the connector 11 and thus firmly press the insulation 12 against the connector 11. The discs comprise cork gaskets 30 and rubber gaskets 31 with brass rings 32 occasionally interposed. A clamping ring 35 is forced toward the ring 26 to compress the gaskets. This is accomplished by a plurality of screws 36 that are threaded through a ring 37 which is secured to the tube 25 by means of screws 38 threaded through the wall of the tube 25. The screws 36 bear against the metal ring 35 and force the same towards the ring 26 to compress the discs.

A sleeve 40 extends from the sheath of the cable 2a to the tube 25, being connected to the sleeve and to the tube in any desired manner, as by means of wiped joints 41—42.

The insulating sleeve 22 is provided with an oil inlet 50 which may be connected in any desired manner to an oil reservoir which maintains the portion of the joint to the left of the dam filled with oil under pressure. In a like manner the other half of the joint is maintained full of oil under pressure by a connection 51 that is connected to an oil feeding reservoir but insulated therefrom by the usual oil line insulator.

An explanation will now be given of the mode of operation of the stopping dam. As the discs are compressed by the screws 36, the rubber is expanded radially by the axial compression thereof. The rubber discs thus produce a compression between the outer sleeve 25 and the wrapped insulation 12 and 13. It is to be noted that the flow of oil in the spaces between the stranded conductors 3 and the factory applied insulation 4 is prevented at the connector 11. The insulation 12 is firmly pressed against the connector 11 and thereby becomes impervious and prevents the leakage of oil along the outside of the connector. No oil can permeate through the wrapped insulation 12 and 13 at the point where the same is compressed by the radial expansion of the rubber 31, and no oil can leak past the stop on the outside of the applied insulation 13 nor along the inner periphery of the sleeve 25. Thus the flow of oil from one side of the dam to the other is effectively stopped.

It is well known that rubber is adversely affected by oil. It is for this reason that the cork discs 30 are provided. The cork discs cover the major portion of the surface of the rubber discs 31 and thus protect the rubber from the action of the oil. Only small portions of the inner and outer peripheries of the two ends of rubber discs 31 are exposed to the action of the oil, the remaining portions being covered by the end cork discs 30. The portion of the rubber that is exposed to the action of the oil swells slightly and therefore expands into firmer engagement with the wall of the tube 25 and with the wrapping 13. This action improves the liquid-tight seal.

The cork discs 30 are desirable primarily as a preservative for the rubber discs 31. There are known rubber substitutes which are not adversely affected by the oils used. The substitute known as "Thiokol" is one such substitute. When the materials used are not adversely affected by the oil of the joint it is possible to omit the cork discs 30, and otherwise modify the details of construction without deviating from the principles herein disclosed.

While we have herein shown one particular way of producing a tight fit between the discs and the sleeve 25, and between the discs and the wrapping 13, it is to be understood that various other means may be used to accomplish this end. For instance, we may use an arrangement such as is disclosed in the United States patent to Eby, No. 1,819,881, of August 18, 1931. In this case the compression on the discs is obtained by clamping the outer sleeve around the discs. In such case the tube 25 would have to be of a material more readily compressible than brass— as lead.

One of the essential features of the present invention lies in the fact that the compressible discs produce a compression from the outer sleeve 25 to the connector 11 and by way of insulation which, when compressed is itself impervious to oil, there can be no seepage of oil from one side of the joint to the other by way of the insulation.

In Figure 4 we have shown the end portion of a fluted sheath cable joint to which our invention is applicable. We have shown only the end of this joint, since the rest of the joint may be of the construction illustrated in Figure 1. The cable is indicated at 55 and includes an outer sheath having internal flutes 56, which define slots 57. The slots 57 constitute oil channels or passageways for permitting a ready flow of oil to or from the cable as the cable undergoes thermal changes. A perforated metal tape 58 is wrapped around the outside of the insulation 4' surrounding the conductor and is in electrical contact with the inside of the sheath. This type of cable is well known in the art and no claim to the cable per se is here made. In this joint the end of the metal braid or gauze 16 that is applied on the outside of the insulating wrapping 13' is wound around the tape 58 and is in good electrical contact therewith. The slots 57 open into the joint at the space between the tapered end of the sleeve 40 and the tape 16, thereby permitting the ready ebb and flow of oil between the cable and the joint. The sleeve 40' is connected to the sheath of the cable 55 as by means of a wiped joint 41'. The joint of Figure 4 is provided with the usual reservoirs, as indicated in Figure 1, for maintaining it full of oil.

In Figure 6 we have shown our invention incorporated in a joint between two 3-conductor cables of the type provided with longitudinal oil channels. Each cable 61 and 62 includes three conductors, indicated at 63, 64, and 65 in Figure 8, with suitable shielded insulation around each. The cable is provided with three longitudinally extending oil channels, indicated at 66, 67, and 68. Each of the oil channels comprises a spirally wound metal ribbon constituting, in effect, a leaky, flexible pipe. This type of cable is well known in the art and no further description thereof is deemed necessary at this time.

In the joint shown in Figure 6 the oil conduits open into the joint. The conductors of the two cables are spread apart and the corresponding conductors of the two cables are joined by connectors indicated at 11'. The insulation on the respective conductors is stepped down towards the bared ends of the conductors and, together with the connector, enclosed in a wrapping of varnished cambric tape 70. The oil stop or dam feature in this joint is obtained by means of two rubber discs 31' and three cork discs 30', that are compressed between a metal plate 26' secured within the sleeve 25', and a metal plate 35' that is forced towards the plate 26' to compress the discs. A plate 37' is secured within the sleeve 25 by means of a plurality of screws 38' and is threaded to receive a plurality of screws 36' for forcing the plate 35' towards the plate 26' to compress the discs 30'—31'. The discs 30' and 31', the plates 26'—35', and 37' are each provided with three openings, through which the three conductors extend.

It is, of course, understood that during the making of the joint the sleeve 25' is slipped back along the cable and the various discs and plates are slipped to the left of the position shown in Figure 6, with the conductors strung through the openings in the discs and plates, in order that those parts may be out of the way during the making of the connection. After the conductors have been connected and properly insulated, the sleeve 25 is brought back to the position shown in Figure 6, and the wiped joint 25a is made. The discs and plates are then assembled into position. Upon axial compression of the rubber discs 31' they expand radially into firm sealing contact around the peripheries of the respective insulated conductors. The wrapped insulation 70 is impervious to oil when it is compressed and, therefore, there is provided a liquid-tight seal between the two ends of the joint. It is to be noted that each of the compressible discs is imperforate except at the places where the conductors pass therethrough. The screws 36' do not extend through the plate 35' and therefore there are no openings to be sealed at the screws. The perforated metal tape 58' is similar to the tape 58 in Figure 4, and the silk tape 19' corresponds with the silk tape 19 shown in Figure 1. The sleeve 25' is connected to the adjacent end of the left-hand joint enclosing sleeve, as by means of a wiped joint 42'.

In Figure 9 we have shown our invention applied to an oil-filled cable wherein the conductors themselves comprise the oil channels. This joint is similar to the joint shown in Figure 1, differing therefrom essentially in that this joint employs a different connector, since the cable conductors are different. Insofar as the two joints are the same, similar reference numerals have been used to designate similar parts, and a description of those parts need not be repeated here. The conductors of the cables connected by the joint of Figure 9 comprise copper wires laid about a central channel or helix of metal ribbon to form the oil duct. The connector comprises two separate parts, indicated at 80 and 81. The part 80 includes a tube 82 suitably secured therein and adapted to enter within the channel of the conductor, and a part 83 adapted to fit around the conductor. A small solder receiving opening 84 is provided at the top of the portion 83. After the conductor and connector piece 80 have been joined as shown in Figure 9, solder is poured into this opening to effect a good electrical connection between the cable conductor and the connector part 80. The part 80 is also provided with a tapered valve plug 85 which may be turned in the connector to establish a communication between the channel of the conductor and an outlet port 86, in order to permit the escape of any air that may be within the connector at the time of making the connection, and in order to bleed the oil channel of any oil that may have become contaminated with air. After all of the contaminated oil has been expelled from the oil channel the valve is turned to the position as shown in Figure 9, thereby closing off the channel. The connector part 81 is, likewise, provided with the parts 82 to 86. The connector 80 is provided with a plug 87, formed integrally therewith, which plug telescopes into a bore in the end of the connector 81. The plug makes a snug fit within the bore, and a good electrical contact between the two is further established by pouring solder through a slot 88 provided in the part 81. It is to be noted that the connector comprising the two pieces 80 and 81 constitutes a solid barrier between the ducts of the two conductors that are joined thereby, thus precluding any possibility of leakage of oil from one conductor to the other by way of the connector.

The stopping dam is arranged in the same manner as is the dam shown in Figure 1, and a further description thereof is not deemed necessary at this time. It is sufficient to state here that the wrapped insulation 12 and 13 is compressed against the solid connector of this joint in the manner previously described in connection with the description of Figure 1.

In Figure 12 we have illustrated a stop-joint similar to the joint shown in Figure 9, and provided, in addition, with means for feeding oil to the respective cables. The connector shown in Figure 12 differs from that shown in Figure 9 only in that each of the two parts of the connector is provided with an oil inlet port which may be brought into communication with the channel or duct of the associated conductor, or in communication with the bleeding port 86, by means of the valve in the connector. The inlet port is indicated at 90. When the valve 85 is turned to the position shown in the drawings it establishes communication between the duct of the associated conductor and the inlet port 90, while maintaining the bleeding port 86 closed. A feeding tube 91 is connected to the inlet port. This tube is of a length sufficient to permit it being wound around the insulated conductor several times, and comprises a flat tube made up of a number of smaller tubes of suitable insulating material and suitably bonded together. After all the air and air-contaminated oil has bled from the duct, the valve is turned to close the bleeding port 86 and establish communication between the oil duct and the inlet port. A wrapping of varnished cambric tape 93 is applied around the connector and around the stepped portions of the original factory insulation 4". The varnished cambric tape is carefully wound so that the feeding tube 91 is embedded therein as a spiral of gradually increasing diameter. The end of the feeding tube opens into the space between the outer sleeve of the joint and the outside of the wrapping applied to the cable conductors. It is to be recalled that this space is maintained full of oil under pressure by being connected to the usual pressure reservoir as shown in Figure 1. By this arrangement the oil ducts of the conductors are maintained full of oil under pressure, the oil flowing to and from the ducts by way of the tubes 91, upon the occurrence of thermal changes.

It is to be noted that the feeding means for the two halves of the joint are independent of one another, and that the pressures on the two halves of the joints may be different. In fact, the pressure may be released on either half of the joint while maintaining full pressure on the other half.

While the stacks of discs are arranged somewhat differently in the different joints, it is to be understood that any of the arrangements shown may be used on any of the different types of joints.

All of the joints disclosed in this application have the following four features in common:

1. A connector which includes a solid barrier to prevent the transfer of oil from one cable end to the other along the interstitial spaces between the strands.

2. Surrounding the connector, insulation which is impervious to the oil or which is practically impervious and, by compression, becomes impervious at the pressure encountered.

3. A rigid outer tube or sleeve.

4. Material which is under radial compression, filling the space between the outer sleeve and the insulation and compressing the insulation against the connector, thereby rendering the insulation impervious and also preventing leakage of oil between the insulation and the connector.

By this arrangement we provide a stop-joint which accomplishes the ends sought to be accomplished, which is simple and economical in its construction, which is compact, and which may be quickly made by workmen sufficiently skilled to make ordinary joints.

While we have shown the stationary plate 26 (Figs. 1 and 2) welded to the sleeve 25, it is to be understood that this plate may be held in position in any other desired manner. For instance, in Figure 13, we have shown the end of the sleeve 25 beaded over to provide an internal flange against which the plate 26 bears. Any other desired arrangement may be used for holding the ring, or plate, 26, in position.

In compliance with the requirements of the patent statutes we have herein shown and described a few preferred embodiments of our invention. It is, however, to be understood that the invention is not limited to the precise constructions herein shown, the same being merely illustrative of the principles thereof.

What we consider new, and desire to secure by Letters Patent, is:

1. In a cable joint of the class wherein a pair of cable conductors are electrically connected by a connector and provided with a wrapping of substantially impervious insulation and with an outer sleeve spaced from the wrapping, and a filling of insulating liquid in the joint, the combination of means for preventing the flow of liquid through the joint from one cable to the other, comprising a yielding member extending between the outer sleeve and the wrapping of insulation and held under compression to form a liquid tight seal at its contact with the sleeve and at its contact with the insulation, said yielding member embracing the wrapped insulation at the connector, whereby the compression of the member compresses the insulation and presses it against the connector.

2. A cable joint between insulated metal sheathed cables, comprising cable sections bared of their sheaths adjacent the ends thereof, a connector joining the conductors, a wrapping of substantially impervious insulation over the connector, an outer sleeve enclosing the connected wrapped conductors and spaced from the wrapping, a pair of spaced discs on the inside of the sleeve, one of said discs being held against longitudinal movement in the sleeve and the other disc being movable towards said one disc, one or more discs of compressible material between the first mentioned discs, each compressible disc being of a width substantially equal to the distance between the wrapping and the sleeve, and means for forcing the two first mentioned discs together to compress the compressible discs against the sleeve and the wrapped insulation.

3. A cable joint between insulated metal sheathed cables, comprising cable sections bared of their sheaths adjacent the ends thereof, a connector joining the conductors, a wrapping of substantially impervious insulation over the connector, an outer sleeve enclosing the connected wrapped conductors and spaced from the wrapping, a pair of spaced discs on the inside of the sleeve, one of said discs being held against longitudinal movement in the sleeve and the other disc being movable towards said one disc, a plurality of side by side discs of compressible material between the first mentioned discs, each compressible disc being of a width substantially equal to the distance between the wrapping and the sleeve, and means for forcing the two first mentioned discs together to compress the compressible discs against the sleeve and the wrapped insulation, said last means comprising a disc fixed with respect to the sleeve, and screw means extending between the last mentioned disc and the movable one of the first mentioned discs.

4. A liquid filled cable joint including a connector between a pair of conductors, substantially impervious insulation over the connector, an outer sleeve enclosing the joint and spaced from the insulation, means dividing the space into separate compartments and preventing the flow of liquid from one compartment to the other, said means comprising means embracing the insulation at the connector and extending to the outer sleeve and under radial pressure and forming a liquid tight seal with said outer sleeve and with the insulation, and compressing the insulation against the connector to prevent the leakage of liquid from one compartment to the other.

5. An oil-filled joint between a pair of insulated sheathed electric cables, said joint including a connector fitting over the conductors and having an internal barrier preventing the transfer of liquid from one conductor end to the other through the connector, a rigid outer sleeve surrounding the connector, a wrapping of insulation which, under pressure, is impervious to oil, said wrapping surrounding the connector and being within and spaced from the sleeve, and between the sleeve and the wrapping a filling of oil-impervious material held by the sleeve under radial pressure and compressing the wrapped insulation against the connector.

6. An oil-filled joint between a pair of insulated sheathed electric cables of the type wherein the conductors comprise oil ducts, separate plugs closing the ends of the conductor ducts, said plugs including means for establishing a controllable communication to the ducts, said plugs being joined electrically to constitute a connector, with the ends of the plugs comprising a barrier preventing the flow of oil through the connector from the end of one conductor to the end of the other conductor, said connector including a cylindrical portion intermediate the ends thereof, insulation over the cylindrical portion, said insulation being impervious to oil, an outer sleeve, and between the sleeve and the insulation a filling of oil-impervious material under radial pressure compressing the insulation against the connector.

7. In a cable joint, the combination of a pair of electrical conductors having longitudinal ducts, a two-piece connector joining said conductors, a telescoping connection between the pieces of the connector and the respective conductors, said pieces comprising closures for the respective ducts, a connection between the two pieces, said connector including a barrier closing off communication between the two ducts, and means for establishing and disestablishing communication between the respective ducts and the outside of the connector, an outer sleeve surrounding the connector and spaced therefrom, and an oil-impervious filling, including insulation, in the space between the connector and the sleeve, said filling being under radial pressure and making a liquid-tight seal around the entire periphery of the connector and around the entire periphery of the sleeve.

8. In an electric system, two high voltage cables each having a conductor having a hollow core comprising an oil duct, a stop-joint between the two cables, said joint including a connector joining the ends of the conductors and having a barrier therein closing off communication between the ducts, a body of applied insulation on said connector, an outer sleeve surrounding the insulation and spaced therefrom, an annular disc surrounding the applied insulation and extending to the sleeve and imperforate between its inner and outer peripheries, said disc being of material which expands radially upon axial compression, means compressing the disc axially, said disc compressing the applied insulation against the connector to prevent the seepage of oil from one side of the joint to the other through the applied insulation.

9. A joint between two cables filled with oil and having lateral oil channels, said joint including connector means joining the cable conductors and preventing the transfer of oil between conductors by way of the connector means, an outer sleeve, means at the connector means for preventing the transfer of oil from one side of the joint to the other, said last named means including a barrier of compressed impervious material filling the space between the connector means and the outer sleeve, and separate means for feeding oil by way of the joint into the cable channels on the two sides of the barrier.

10. A joint between two cables filled with insulating liquid and having passageways for permitting an ebb and flow of insulating liquid within the cables, connector means joining the cable conductors and preventing liquid flow between them, substantially impervious insulation around the connector means, an outer sleeve surrounding the joint and spaced from the insulation, compressed impervious material filling the space between the sleeve and the insulation at the connector means and placing the insulation under radial pressure and dividing the joint into two compartments sealed from one another, and separate means for feeding insulating liquid by way of the joint to the passageways of the cables on the two sides of the joint.

11. In a cable joint comprising a pair of cable conductors, a connector electrically connecting said conductors, a wrapping of insulating material and an outer casing, the combination with said joint of an oil stop disposed between said outer casing and said insulating wrapping and formed of resilient material having the characteristic of radial expansion by axial compression, and means for applying pressure axially to said stop and expanding the same radially against the outer casing and the insulating wrapping to stop the flow of oil therebetween and, by the pressure imposed upon said insulating wrapping by the radial expansion of said resilient stop, compressing said wrapping radially to render the same impervious to the passage of oil longitudinally therethrough.

12. In a cable joint comprising a pair of cable conductors, a connector electrically connecting said conductors, a wrapping of insulating material and an outer casing, the combination with said joint of an oil stop disposed between said outer casing and said insulating wrapping and formed of resilient material having the characteristic of radial expansion by axial compression, and means for applying pressure axially to said stop and expanding the same radially against the outer casing and the insulating wrapping to stop the flow of oil therebetween and, by the pressure imposed upon said insulating wrapping by the radial expansion of said resilient stop, compressing said wrapping radially to render the same impervious to the passage of oil longitudinally therethrough, said connector having an internal barrier for preventing flow of oil from one conductor to the other conductor.

13. In a cable joint comprising a pair of cable conductors, a connector electrically connecting said conductors, a wrapping of insulating material and an outer casing, the combination with said joint of an oil stop disposed between said outer casing and said insulating wrapping, said oil stop being formed of resilient material not adversely affected by the oils used in the joint and having the characteristic of radial expansion by axial compression, and means for applying pressure axially to said stop and expanding the same radially against the outer casing and the insulating wrapping to stop the flow of oil therebetween and, by the pressure imposed upon said insulating wrapping by the radial expansion of said resilient stop, compressing said wrapping radially to render the same impervious to the passage of oil longitudinally therethrough.

14. In a cable joint comprising a pair of cable conductors, a connector electrically connecting said conductors, a wrapping of insulating material and an outer casing, the combination with said joint of an oil stop disposed between said outer casing and said insulating wrapping and formed of resilient material having the characteristic of radial expansion by axial compression, means for applying pressure axially to said stop and expanding the same radially against the outer casing and the insulating wrapping to stop the flow of oil therebetween and, by the pressure imposed upon said insulating wrapping by the radial expansion of said resilient stop, compressing said wrapping radially to render the same impervious to the passage of oil longitudinally therethrough, and means protecting said oil stop against being adversely affected by the oils used in the joint.

15. In a cable joint comprising a pair of cable conductors, a connector electrically connecting said conductors and a wrapping of insulating material, the combination with said joint of an oil stop disposed adjacent said insulating wrapping and formed of resilient material having the characteristic of radial expansion by axial compression, means for confining said stop against outward radial expansion under axial compression, and means for applying pressure axially to said stop to expand the same radially inwardly against said insulating wrapping and, by the pressure imposed upon said insulating wrapping by the radial expansion of said resilient stop, compressing said wrapping to render the same impervious to the passage of oil longitudinally therethrough.

NELSON E. BUCK.
DENNEY W. ROPER.
ALEXANDER P. THOMS.